(12) United States Patent
Sharivker et al.

(10) Patent No.: US 9,682,434 B2
(45) Date of Patent: Jun. 20, 2017

(54) MILLING CUTTER FOR CUTTING A NINETY-DEGREE SHOULDER IN A WORKPIECE

(75) Inventors: Leonid Boris Sharivker, Nahariya (IL); Sergei Vladimir Boulakhov, Nahariya (IL)

(73) Assignee: KENNAMETAL INC., Latrobe, PA (US)

( * ) Notice: Subject to any disclaimer, the term of this patent is extended or adjusted under 35 U.S.C. 154(b) by 1224 days.

(21) Appl. No.: 13/245,013

(22) Filed: Sep. 26, 2011

(65) Prior Publication Data

US 2013/0078044 A1  Mar. 28, 2013

(51) Int. Cl.
*B23C 5/10*       (2006.01)

(52) U.S. Cl.
CPC ............ *B23C 5/10* (2013.01); *B23C 2210/04* (2013.01); *B23C 2210/0442* (2013.01); *B23C 2210/54* (2013.01); *Y10T 407/1948* (2015.01)

(58) Field of Classification Search
CPC ........................................................ B23C 5/10
USPC ..................................................... 407/53, 54
See application file for complete search history.

(56) References Cited

U.S. PATENT DOCUMENTS 5,382,118 A † 1/1995 Satran et al.
6,336,776 B1 † 1/2002 Noggle
7,094,005 B2 † 8/2006 Svensson
7,604,441 B2 † 10/2009 Bhagath
7,891,916 B2 † 2/2011 Takahashi et al.
2002/0031409 A1 * 3/2002 Sato et al. ...................... 407/53
2006/0067797 A1 † 3/2006 Calamia

FOREIGN PATENT DOCUMENTS

| DE | 69614021 T2 † | 6/2002 | |
| DE | 112004003001 T5 † | 10/2007 | |
| JP | 2003-300112 A * | 10/2003 | ............... B32C 5/10 |
| JP | 2003291024 A † | 10/2003 | |
| JP | 2007-276008 A * | 10/2007 | ............... B23C 5/10 |
| JP | 2010-201565 A * | 9/2010 | ............... B23C 5/10 |

OTHER PUBLICATIONS

JP_2003_300112A_Translation.*

* cited by examiner
† cited by third party

*Primary Examiner* — Sunil K Singh
*Assistant Examiner* — Ryan Rufo
(74) *Attorney, Agent, or Firm* — Matthew S. Besole

(57) ABSTRACT

A milling cutter includes a shank portion and a cutting portion having a cylindrical outer surface. The milling cutter includes a plurality of major cutting edges extending from an end face toward the shank portion, and a plurality of minor cutting edges disposed at the end face of the cutting portion. A relief surface is formed in the cylindrical outer surface proximate a corner of the milling cutter such that the primary cutting edges forms an angle equal to 90° with respect to the end face of the milling cutter. As a result, the milling cutter is capable of cutting a perfect 90° shoulder in a workpiece.

4 Claims, 7 Drawing Sheets

MILLING CUTTER FOR CUTTING A NINETY-DEGREE SHOULDER IN A WORKPIECE

BACKGROUND OF THE INVENTION

The invention relates generally to milling cutters and, more particularly, relates to an end milling cutter having a square footprint and capable of cutting a ninety degree shoulder in a workpiece.

Milling is a cutting machining process using a rotating tool. In that procedure, the cutting edges produce the cutting movement by virtue of their rotation about the central axis of the tool. The advance movements can take place in various directions. They are effected by the tool or by the workpiece or even by both. In contrast to turning and drilling, the cutting edges are not constantly in engagement. After a cut on the workpiece, they are returned in the disengaged condition to the point of first cut. As a result, they can cool down and discharge the chips from the chip spaces.

In principle, a distinction is made between three different milling cutting processes: peripheral milling, end milling and end-peripheral milling. Peripheral milling, also referred to as hob milling, is a milling process in which the major cutting edges which are at the periphery of the tool generate the desired workpiece surface; the milling cutter axis therefore extends parallel to the working surface and perpendicularly to the advance direction of the milling cutter. In the end milling process, the desired workpiece surface to be produced is that to which the milling cutter axis is perpendicular, and in that case, the advance direction of the milling cutter is parallel to the workpiece surface produced. In that case, however, essential chip removal is also effected primarily with the major cutting edges arranged at the peripheral surface. The minor cutting edges which are at the end of the tool smooth the milled surface, and thus produce the workpiece surface. Finally, in end-peripheral milling, both the major and also the minor cutting edges produce the desired workpiece surfaces.

Relatively high-grade surfaces can be produced by means of end milling. In that respect, the minor cutting edges are solely responsible for the surface produced. They move in one plane and not on a curved working surface like the major cutting edges that generate the workpiece surface in peripheral milling. Fine final machining of flat surfaces is possible with suitable end milling cutters. The general view is that the quality of the particularly flat and smooth surfaces produced by end milling is essentially determined by the cutting edge corner shape and by the orientation of the minor cutting edges.

A conventional milling cutter 100 is shown in FIGS. 5-7. In the conventional milling cutter 100, a cutting portion 104 has a plurality of major cutting edges 106 that are separated from each other by a corresponding number of spiral flutes 108. The milling cutter 100 shown in FIG. 4 has two major cutting edges 106 and two spiral flutes 108. The milling cutter 100 shown in FIGS. 5-7 has four major cutting edges 106 and four spiral flutes 108. Peripheral surface sections of the cutting portion 104 define a cylindrical envelope surface 109 of the cutting portion 104. The end face 117 of the cutting portion 104 have minor cutting edges 107.

As shown in FIG. 5, the conventional milling cutter 100 also includes a primary clearance face 110, a secondary clearance face 112 and a chip gash 114. In addition, an end portion 120 of the minor cutting edges 107 of conventional milling cutter 100 has a hook-shape when viewed from the end face 117, as highlighted in FIG. 6.

The milling cutter 100 rotates about a central, longitudinal axis 116, as shown in FIG. 6. Specifically, the milling cutter 100 shown in FIG. 6 rotates in a counter-clockwise direction about the central, longitudinal axis 116.

As seen in FIGS. 6 and 7, the corner 118 of the conventional milling cutter 100 is not formed at an angle of 90°, but at an angle other than 90°. As a result, the conventional milling cutter 100 cuts a shoulder in the workpiece 200 at an angle 132 that is not exactly equal to 90°, but rather produces a chamfer in the workpiece 200. Further, the conventional milling cutter experiences a very short tool life when attempting to cut a 90° shoulder in the workpiece 200. Unfortunately, there are numerous metal cutting applications in which it would be desirable to cut a 90° shoulder in a workpiece.

SUMMARY OF THE INVENTION

The problem of a cutting tool, such as a milling cutter, forming a perfect 90° shoulder in a workpiece is solved by providing a relief surface on the cylindrical peripheral surface of the milling cutter to produce a perfect 90° corner on the milling cutter that results in all points of the cutting edge being located on the outer diameter of the milling cutter.

In one aspect, a milling cutter comprises a shank portion; a cutting portion having a cylindrical outer surface, the cutting portion defining a axis of rotation of the cutter; at least one major cutting edge extending from an end face toward the shank portion; at least one minor cutting edge disposed at the end face of the cutting portion, the end face defining an outer diameter, D, of the milling cutter; and a relief surface formed in the cylindrical outer surface proximate a corner of the milling cutter such that the at least one primary cutting edge forms an angle equal to 90° with respect to the end face of the milling cutter.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
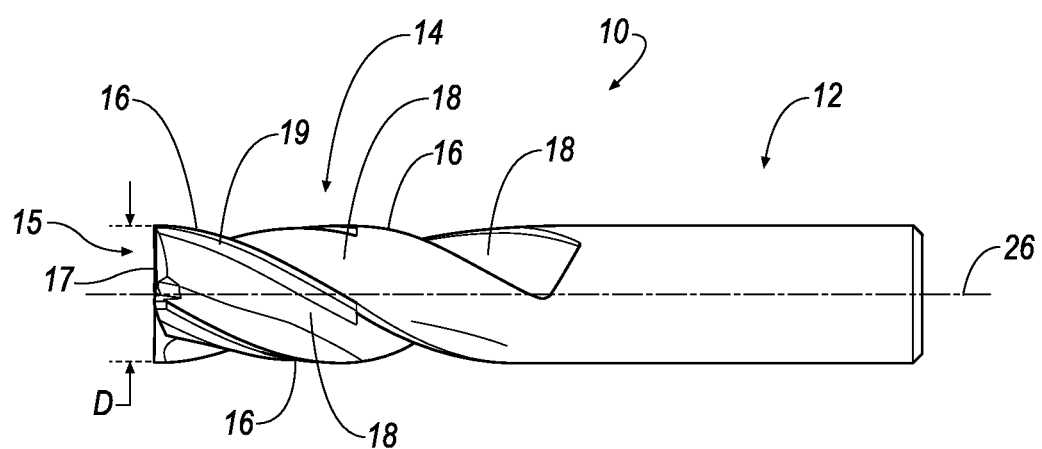
FIG. 1 is a side view of a milling cutter according to an embodiment of the invention.

Below are illustrations and explanations for a milling cutter capable of cutting a 90° shoulder in a workpiece.

However, it is noted that the milling cutter may be configured to suit the specific application and is not limited only to the example in the illustrations.

Referring now to FIGS. 1-4, a milling cutter is shown generally at 10 according to an embodiment of the invention. The milling cutter 10 includes a shank portion 12 and a cutting portion 14. The shank portion 12 is in the form of a cylindrical shank. It is appreciated that it is also possible to use all other shank shapes, such as, for example, a Morse taper shank, a steep-angle taper shank, a Weldon shank or a whistle notch shank. In the milling cutter 10, the cutting portion 14 has a plurality of major cutting edges 16 that are separated from each other by a corresponding number of spiral flutes 18. For example, the milling cutter 10 has four major cutting edges 16 and four spiral flutes 18. However, it will be appreciated that the invention is not limited by the number of cutting edges and flutes, and that the principles of the invention can be practiced with any desirable number of cutting edges and flutes.

Figure 3:
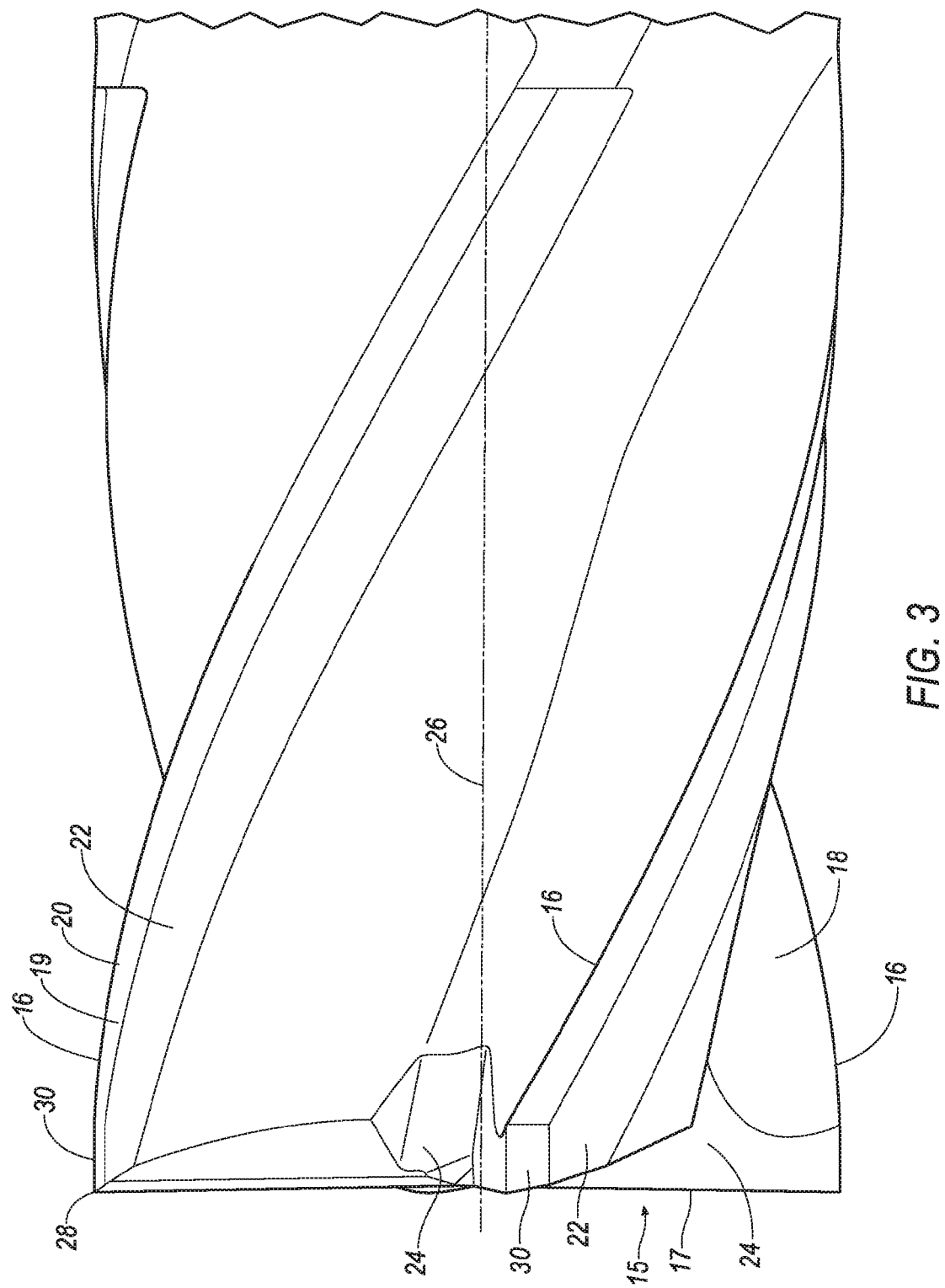
FIG. 3 is a partial side view of the milling cutter of FIG. 1.

Peripheral surface sections of the cutting portion 14 define a cylindrical outer surface 19 of the cutting portion 14. An end face 15 of the cutting portion 14 have minor cutting edges 17 formed at a positive dish angle 29 with respect to a plane perpendicular to the central, longitudinal axis 26, as shown in FIG. 3. The milling cutter 10 has an outer diameter, D, as shown in FIG. 4.

Figure 2:
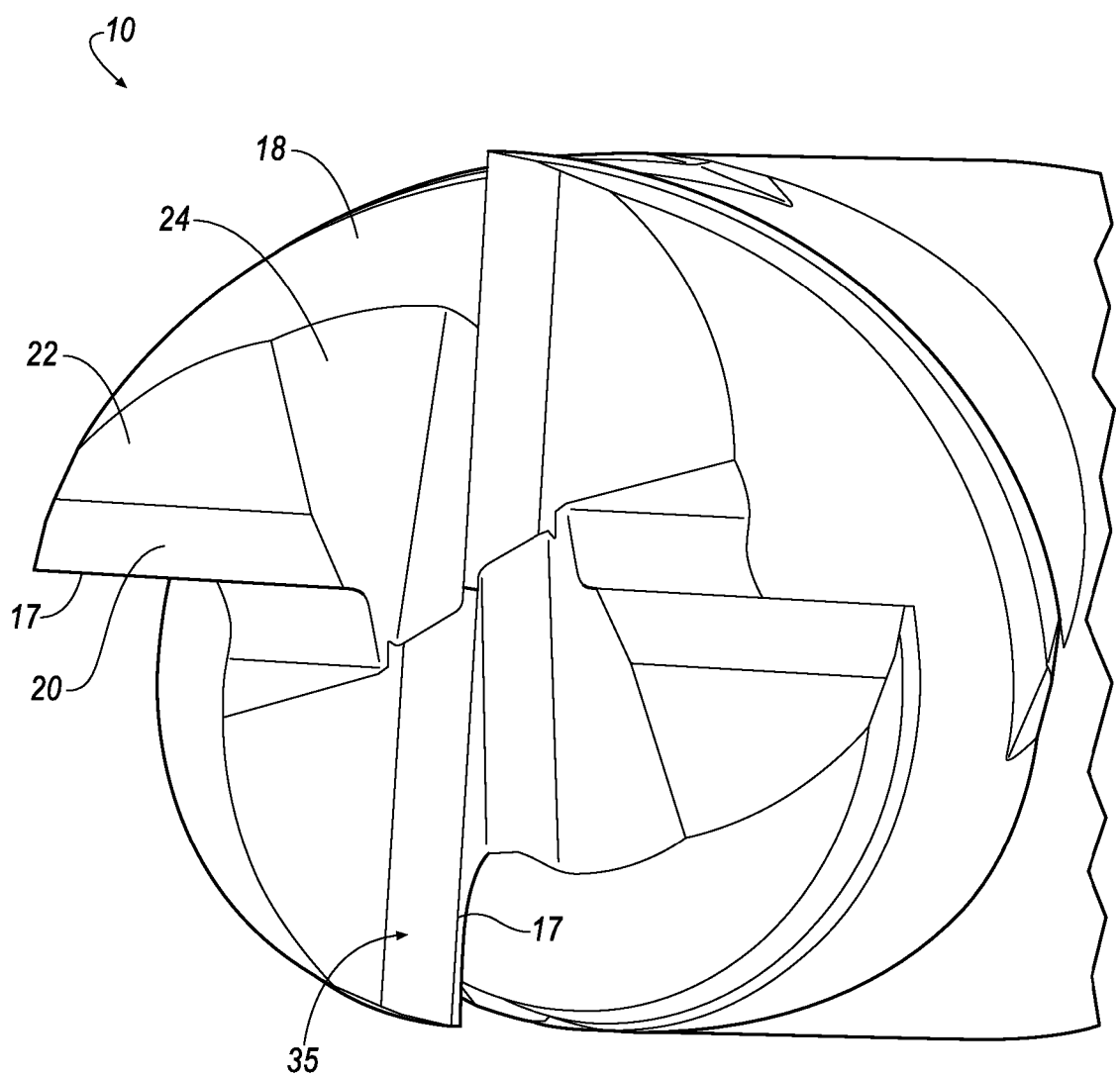
FIG. 2 is an isometric end view of the milling cutter of FIG. 1 according to an embodiment of the invention.

As shown in FIG. 2, the milling cutter 10 also includes a primary clearance face 20, a secondary clearance face 22 and a chip gash 24, as shown in FIG. 2. In addition, an end portion 35 of the minor cutting edges 17 of milling cutter 10 does not have a hook-shape, but is straight when viewed from the end face 15, as highlighted in FIG. 2.

The milling cutter 10 rotates about a central, longitudinal axis 26, as shown in FIG. 3. As shown, the milling cutter 10 rotates in a counter-clockwise direction about the central, longitudinal axis 26.

Figure 4:
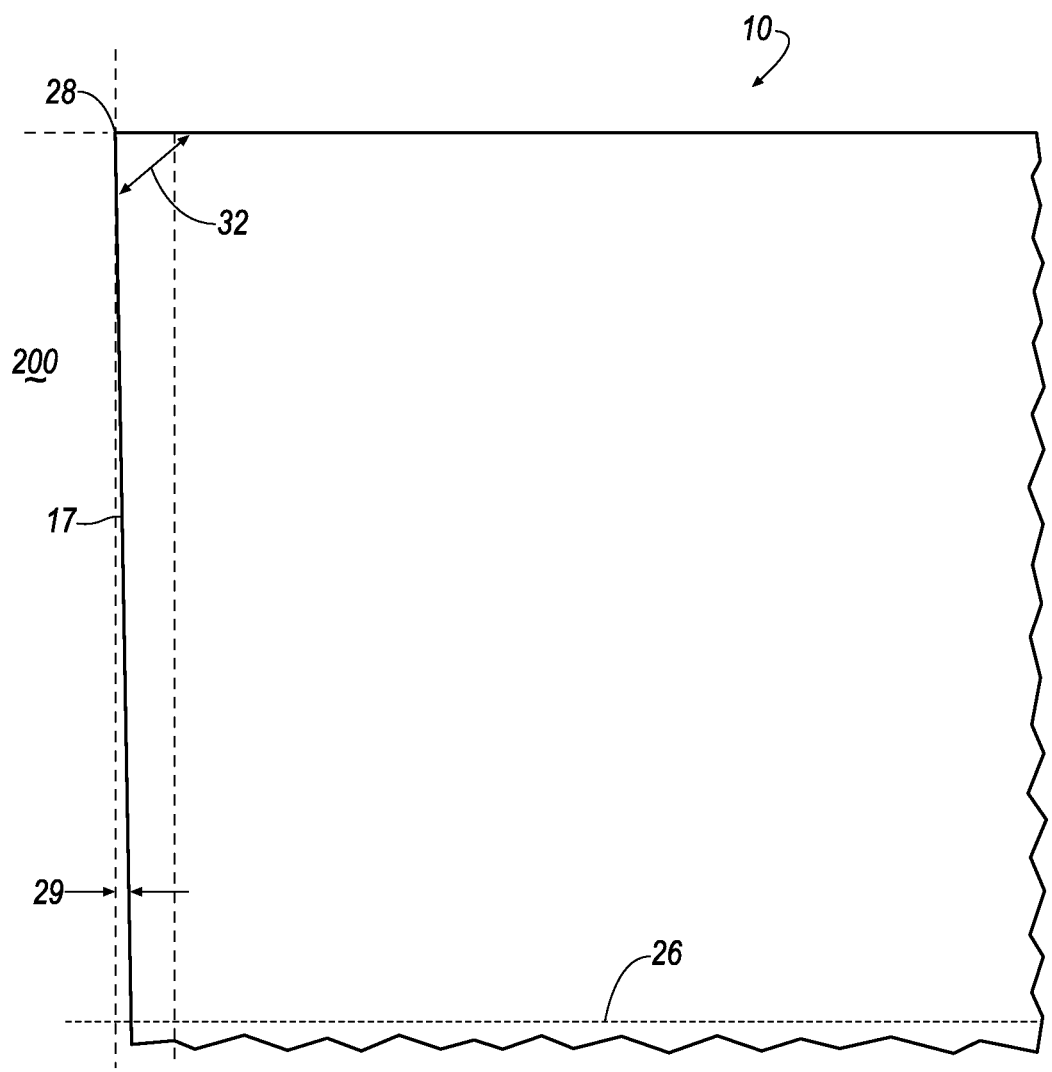
FIG. 4 is a partial, enlarged plan view of the milling cutter of FIG. 1 showing the perfect 90° corner for machining a 90° shoulder in a workpiece according to an embodiment of the invention.
Figure 5:
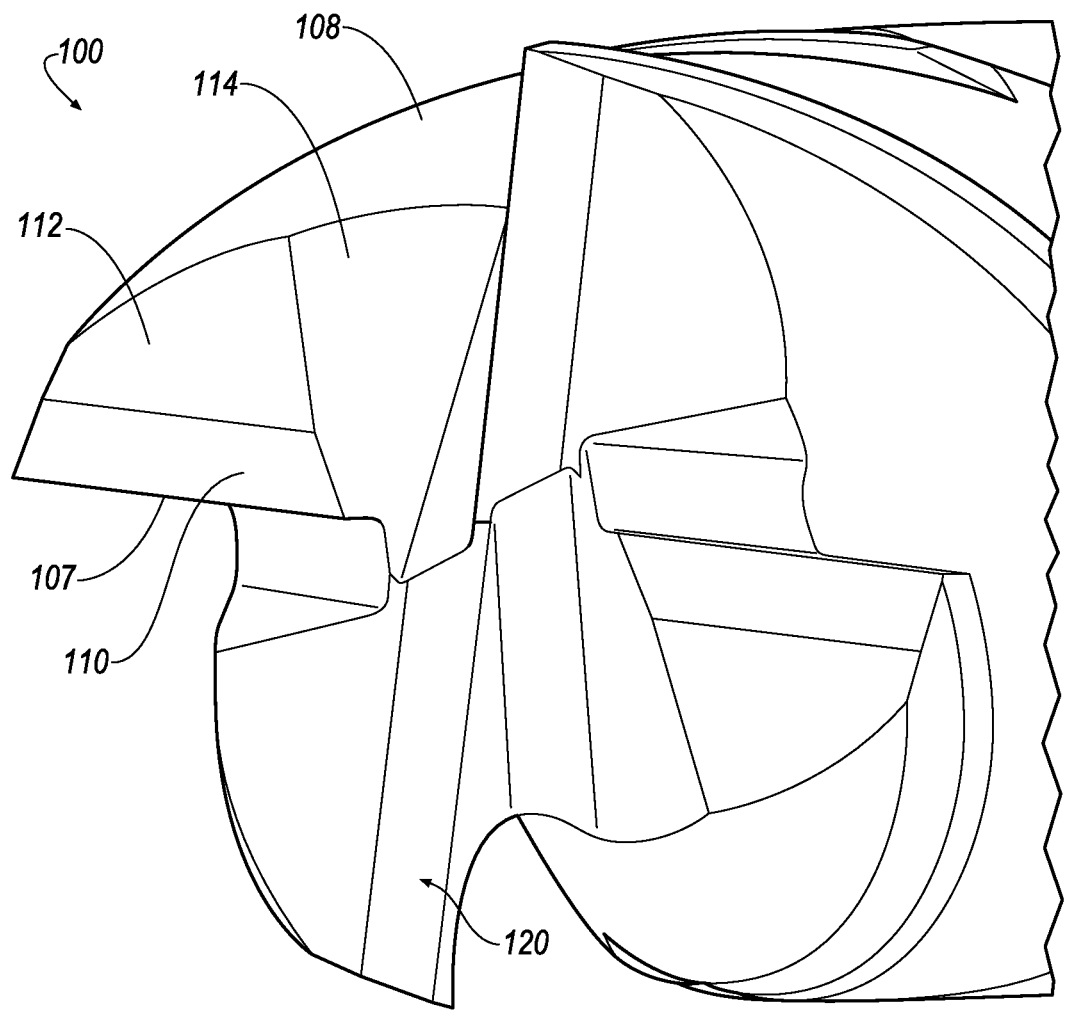
FIG. 5 is an end isometric view of a conventional milling cutter.
Figure 6:
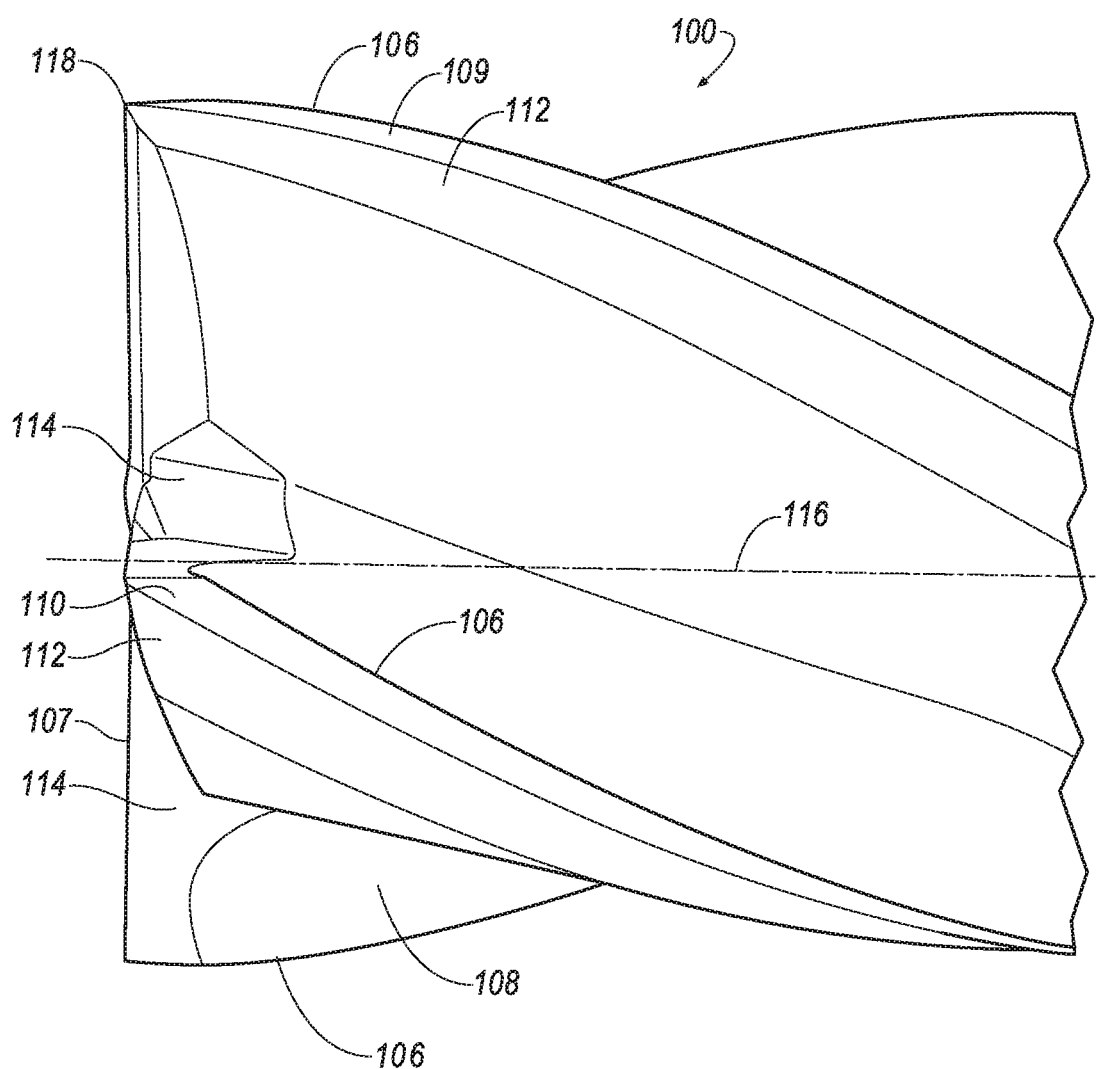
FIG. 6 is a partial side view of the conventional milling cutter of FIG. 5.
Figure 7:
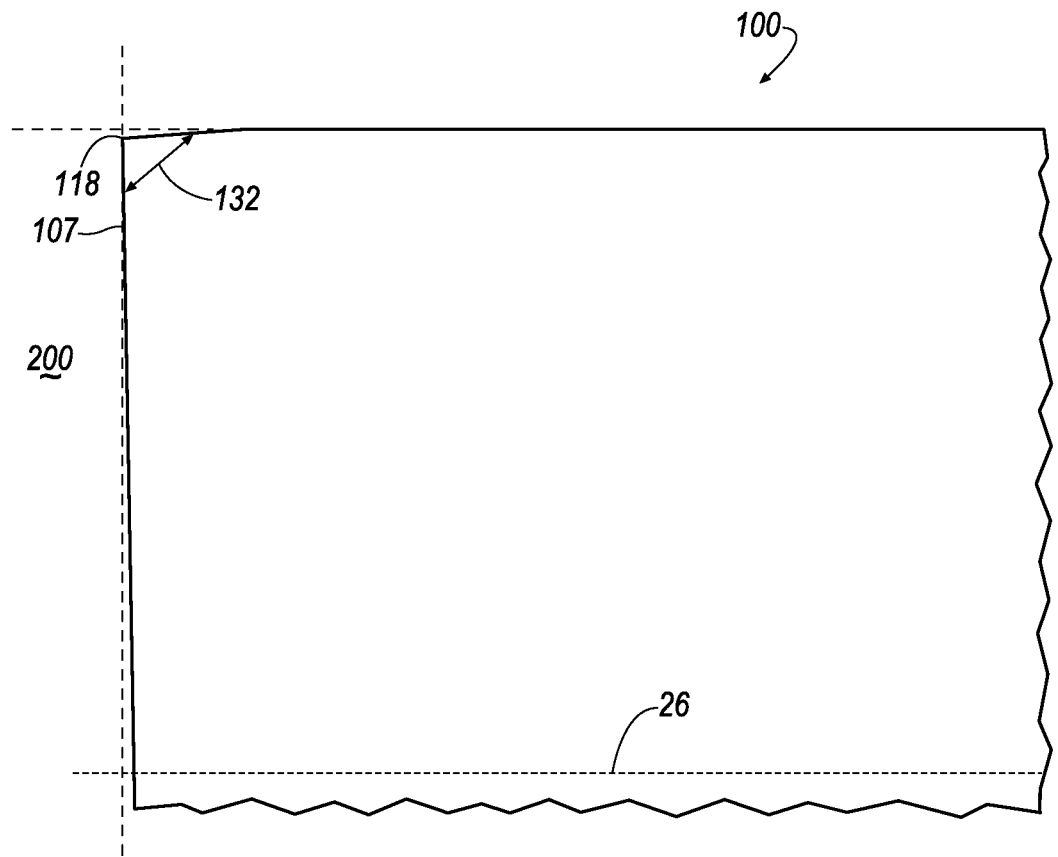
FIG. 7 is a partial, enlarged plan view of the conventional milling cutter of FIG. 5 showing a corner less than 90°.

As seen in FIGS. 3 and 4, one aspect of the invention is that a corner 28 of the milling cutter 10 is formed at the intersection of the end face 15 and a relief surface 30 on the outer surface 19 of the cutting portion 14 proximate the corner 28. It is noted that the corner 28 of the milling cutter 10 of the invention is not formed at an angle of exactly 90°, but is less than 90° because of the positive dish angle 29. In fact, the angle of the corner 28 can be any desirable angle less than 90°. However, the relief surface 30 enables the milling cutter 10 to cut a shoulder at an angle 32 exactly equal to 90° in the workpiece 200. This is because the relief surface 30 is substantially parallel to the central, longitudinal axis 26 of the milling cutter 10, and the end face 15 and minor cutting edges 17 do not participate in the cutting process due to the positive dish angle 29, unlike the conventional milling cutter 100.

In addition, the relief surface 30 enables more of the primary cutting edge 16 to be located on the outer diameter, D, of the milling cutter 10, thereby providing for a longer tool life as compared to the conventional milling cutter 100.

The milling cutter 10 can be manufactured by the following steps:
1) forming the flutes;
2) grinding the end face;
3) grinding the primary cutting edges; and
4) grinding the relief surface proximate the corner.

The patents and publications referred to herein are hereby incorporated by reference.

Having described presently preferred embodiments the invention may be otherwise embodied within the scope of the appended claims.

What is claimed is:

1. A milling cutter, comprising:
    a shank portion;
    a cutting portion having a cylindrical outer surface, the cutting portion defining an axis of rotation of the cutter about a central, longitudinal axis;
    at least one major cutting edge extending from an end face toward the shank portion;
    at least one minor cutting edge disposed at the end face of the cutting portion, the end face defining an outer diameter, D, of the milling cutter;
    a corner formed at an intersection of the end face and the relief surface; and
    a relief surface formed on the cylindrical outer surface proximate the corner and extending from the end face toward the shank portion,
    wherein the corner is formed at an angle less than 90°, and
    wherein the relief surface is parallel to the central, longitudinal axis of the milling cutter such that the at least one major cutting edge cuts a perfect 90° shoulder in a workpiece during a machining operation.

2. The milling cutter according to claim 1, wherein the end face defines a positive dish angle with respect to a plane perpendicular to the central, longitudinal axis.

3. The milling cutter according to claim 1, wherein an end portion of the at least one minor cutting edge is planar when viewed from the end face.

4. The milling cutter according to claim 1, wherein the milling cutter includes a plurality of major cutting edges separated from each other by a corresponding number of spiral flutes.

* * * * *